United States Patent [19]

Hausdörfer

[11] Patent Number: 4,656,502
[45] Date of Patent: Apr. 7, 1987

[54] COLOR MIXING OR INTERFERENCE REDUCTION CIRCUIT IN COLOR TV DECODING CIRCUITS

[75] Inventor: Michael Hausdörfer, Mühtal, Fed. Rep. of Germany

[73] Assignee: Robert Bosch GmbH, Stuttgart, Fed. Rep. of Germany

[21] Appl. No.: 675,193

[22] Filed: Nov. 27, 1984

[30] Foreign Application Priority Data

Nov. 30, 1983 [DE] Fed. Rep. of Germany ....... 3343261

[51] Int. Cl.⁴ .............................................. H04N 9/78
[52] U.S. Cl. .................................... 358/31; 358/37
[58] Field of Search ...................... 358/31, 37, 39, 40, 358/36

[56] References Cited

U.S. PATENT DOCUMENTS

| | | | |
|---|---|---|---|
| 4,263,612 | 4/1981 | Gibson | 358/31 |
| 4,348,689 | 9/1982 | Achiha | 358/31 |
| 4,570,177 | 2/1986 | Kondo | 358/31 |

FOREIGN PATENT DOCUMENTS 2411296 9/1975 Fed. Rep. of Germany .

*Primary Examiner*—Michael A. Masinick
*Attorney, Agent, or Firm*—Frishauf, Holtz, Goodman & Woodward

[57] ABSTRACT

The luminance signal is connected to a transmission channel which includes a subtraction circuit (3) and a branch circuit, to apply a subtraction signal to the subtraction circuit. The branch circuit includes a band-pass filter connected to receive the luminance signal and a controlled amplifier (5) serially connected with a band-pass filter. The branch circuit is additionally connected to a circuit to derive the control signal for the controlled amplifier, the control signal being obtained from a control signal generating circuit which generates the control signal as a function of the portion of the luminance signal which is within the band-pass width of the chrominance subcarrier. The signal can be obtained, for example, by forming a level signal representative of the luminance components based on the color difference signals; and/or by synchronous demodulation of the luminance signal with respect to the chrominance subcarrier; and/or by a comb filter.

6 Claims, 6 Drawing Figures

COLOR MIXING OR INTERFERENCE REDUCTION CIRCUIT IN COLOR TV DECODING CIRCUITS

Reference to related application, assigned to the assignee of the present invention: "Method and System for Interference Suppression in a Color Television System", Michael Hausdörfer, Ser. No. 675,194, filed Nov. 27, 1984, claiming priority of P 33 43 262, Fed. Rep. Germany.

The present invention relates to the processing of color television signals and more particularly to reduction of color mixing, or color interference in a color TV coding circuit.

BACKGROUND

Various types of circuits have been proposed to reduce color interference, or undesired mixing of signals within a TV coding network. Some such circuits are located in the luminance channel of a color television (TV) coding apparatus. A circuit which has been proposed—see German patent disclosure document DE-OS 24 11 296—provides for transmission of the luminance signal in two channels—on one channel unchanged and in another channel through a band-pass. The two channels are supplied to the respective inputs of the subtraction circuits. Those spectral portions which are within the range of the auxiliary chroma carrier and occur in the luminance signal are thereby suppressed. The sharpness of the TV image is, however, impaired since these portions contribute to sharpness and definition of the TV image which is to be reproduced. To decrease loss of sharpness, the output signals of the band filter are conducted through a threshold circuit and added to the output signal of the subtraction circuit. This arrangement then provides that, up to a predetermined amplitude, these portions continue to be conductive and may contribute to the sharpness of the viewed image.

It has also been proposed to provide a chroma carrier filter, or blocking circuit, within the luminance channel of the coder. The damping, that is, the band block, can be controlled by a control voltage. The control voltage is derived by measuring the amplitude of the portions of the luminance signal within the range of the chrominance subcarrier.

Both circuits have some disadvantage; the first circuit above described does not optimally suppress the portions of the luminance signals which are within the range of the chrominance subcarrier for all possible images or scenes to be reproduced. The second circuit has the disadvantage that the blocking circuit within the luminance channels causes undesired phase shifts which may lead to the appearance of edge effects, or random oscillations.

THE INVENTION

It is an object to improve the reproduction of color television images and, specifically, to reduce color mixing or interference in a color television coder which is adapted to the respectively present images to be reproduced and which ensures transmission of the luminance signal with only slight interference therewith.

Briefly, a transmission channel is placed between the input and output of the coder which includes a subtraction circuit receiving the luminance signal, and a branch circuit, the branch circuit including a band-pass filter connected to receive the luminance signal. A controlled amplifier is serially connected with the band-pass signal, within the branch circuit, the branch circuit being connected to the subtraction circuit to apply a subtraction signal thereto. A control signal generating circuit is provided, controlling the amplification of the controlled amplifier as a function of the portion of the luminance signal, which portion is within the band-pass width of the chrominance subcarrier. Of course, circuits other than controlled amplifiers may be used in order to control the level of the signal within the branch circuit.

The circuit has the advantage that for those scenes or images to be reproduced, in which no drop of the luminance signal within the band-pass range of the chrominance signal carrier is necessary, the luminance signal can be supplied to the coder without any distortion thereto, so that no phase shifts or phase distortion within the luminance signal may occur.

DRAWINGS

FIG. 1 is a schematic block circuit diagram illustrating the basic structure of the present invention;

FIG. 2, in graphs a, b, c, is a voltage-frequency diagram of signals which arise in the circuit of FIG. 1;

DETAILED DESCRIPTION

Figure 1:
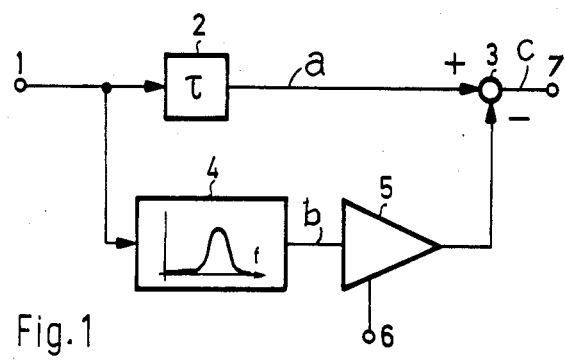

The luminance signal is applied to terminal 1 (FIG. 1) to be transmitted to a color television (TV) coder at terminal 7. The TV coder can be in accordance with any well-known and suitable structure and, hence, is not illustrated.

The luminance signal Y is connected from terminal 1 through a time delay circuit 2, without change in frequency, to one input of a subtraction circuit 3. The output of the subtraction circuit 3 is connected to the output terminal 7. The luminance signal Y is, additionally, connected to a band-pass 4 and a transmission circuit in which the level can be controlled, typically a controlled amplifier 5. The output of the amplifier 5 is connected to the subtracting input of the subtraction circuit 3. The controllable amplifier receives control signals, typically in the form of control voltages from a control input terminal 6.

Figure 2:
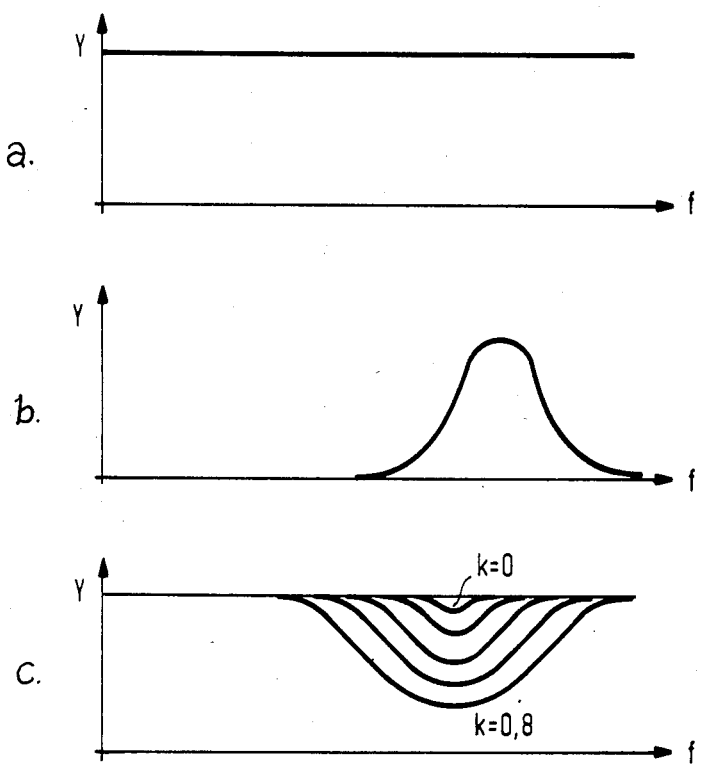

The transfer function, with respect to frequency, of the circuit of FIG. 1, is shown in FIG. 2. Graph a shows the straight signal at the output of the delay line 2. The latter designations of the graphs of FIG. 2 have also been added to FIG. 1 at the respective signal points. Graph b shows the characteristic of the band-pass 4, and the signal shown in graph b of FIG. 2 will appear at the output of the band-pass 4. Subtracting the signal of graph b from the signal of the graph a will provide an output signal at terminal 7 which is shown in graph c of FIG 2. A family, or plurality of curves, will arise within the range of the auxiliary chroma carrier, depending on the level of amplification of the controlled amplifier 5 based on the control signal applied to terminal 6. k is the normalized control voltage which may vary between 0 and 1.

Figure 3:
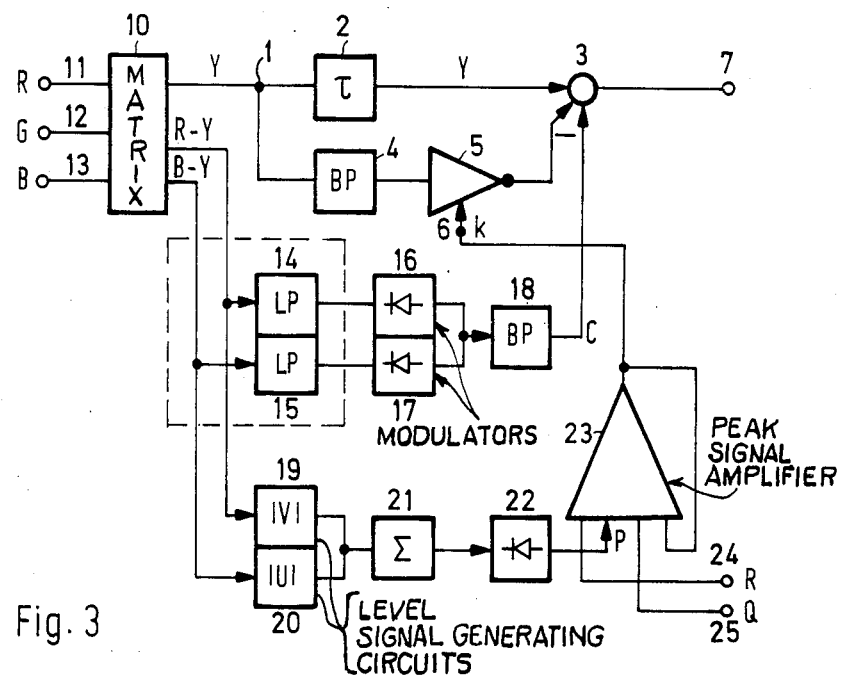
FIG. 3 is a more detailed diagram of the circuit of FIG. 1, in which the control signal is derived as a function of color saturation.

The circuit of FIG. 3 shows, essentially, the same elements as the circuit of FIG. 1, with additions to show how the control voltage is derived.

The color signals R, G, B, which are the red, green and blue signals, respectively, are connected to inputs 11, 12 and 13 of a matrix 10 which generates the luminance signal Y and the color difference signals R-Y and B-Y. The color difference signals are then conducted over low-pass filters 14,15, respectively, to modulators 16,17. The modulators are controlled by chroma carriers which are phase-shifted 90° with respect to each other, so that quadrature modulated output signals of chroma subcarrier frequency result. Such signals are used in the standard NTSC and the PAL TV systems.

A further band-pass filter 18 is provided in order to suppress harmonics which arise during modulation. The resulting color signal C is applied to a further input of the subtraction circuit 3. The output terminal 7 then will have the TV color signal appear thereat.

The control voltage for the controlled amplifier 5 is obtained by the components 19–23. In accordance with FIG. 3, the circuits 19 and 20, connected, respectively, to the color difference signals generate a signal representative of the level of the color difference signals. After formation of this signal representative of level of the color difference signals, the level representative signals are combined and conducted to an adder and then detected in a detector 22. The detector provides the signal which will form the control signal for the amplifier 5 at the terminal 6. The detector may, for example, be a detection circuit which is a peak rectifier—of any suitable circuit or type—which provides a signal representative of peak value. An integration circuit also may be used since the color difference signals, in the circuits 19,20, which are only concerned with the level of the difference signals, are already rectified.

The circuit of FIG. 3 shows, further, a summing amplifier 23 so that the color signal from detector 22 can be modified by additional control signals. The amplifier 23 receives a control signal P from the detector 22, representative of color saturation. In addition, however, other control signals to decrease color interference or mixing, or cross-talk or intermodulation may be used. Two inputs 24,25 are provided for the amplifier 23, on which control signals, R and Q—to be described below—can be applied.

Figure 4:
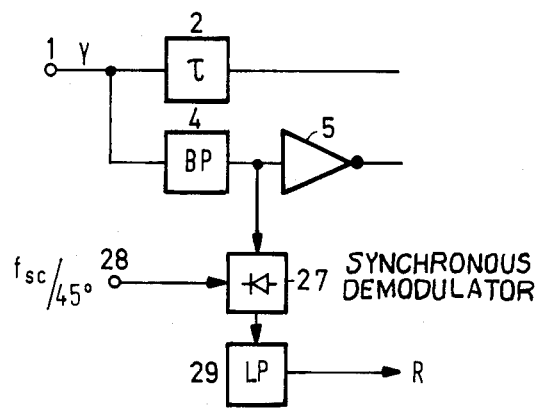
FIG. 4 is a diagram in which a control voltage is derived by means of a synchronous demodulator.
Figure 5:
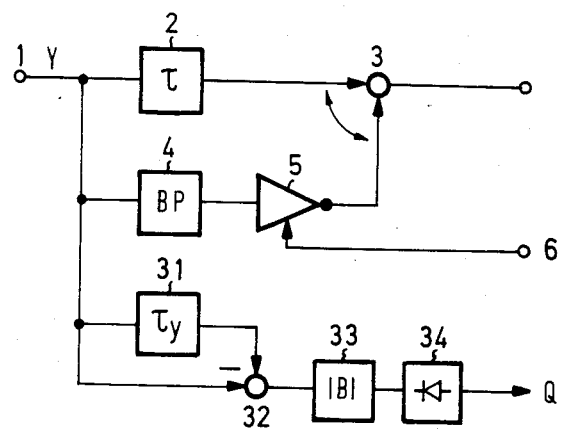
FIG. 5 is a diagram illustrating how a control voltage can be derived by means of a comb filter.

FIGS. 4 and 5 illustrate circuits to derive the further control signals R and Q. The control signal applied to terminal 6 of amplifier 5 is denoted as k.

EMBODIMENT OF FIG. 4

The components 1, 2, 4, 5—described in FIG. 1, are shown. The signal portions passed by the band-pass 4 within the range of the chroma sub-carrier are supplied to a synchronous demodulator 27 which receives a signal representative of the chroma carrier frequency at terminal 28. The result of synchronous demodulation is then conducted over a low-pass filter 29 and is available as a control signal R at the output from the low-pass filter 29.

Rather than using the control signal and applying it to the amplifier 23 (FIG. 3), a voltage can be applied to the amplifier 5 which is manually set in accordance with the overall image or scene content to be transmitted. The circuit of FIG. 4 has the advantage that portions within the luminance channel can be used to form the control voltage, which portions are in the immediate vicinity of the chroma subcarrier frequency.

EMBODIMENT OF FIG. 5

Figure 6:
FIG. 6 is a diagram illustrating how a control voltage can be derived by means of an adjustable voltage source.

The elements 1–5 are identical to those shown in FIG. 1. The luminance signal is applied to a comb filter formed by a delay line 31, and a subtraction circuit 32. The delay line 31 delays the luminance signal for the duration of one TV line. Signals which are correlated between two subsequent lines are cancelled in the subtraction circuit 32 which, then, will effectively have only noise signals at its output. The noise signals are connected to a level detection circuit 33 and then to a detector 34. The output at terminal Q is a signal, the level of which is proportional to noise amplitude, and can be used as the control signal Q to be applied to the amplifier 23 (FIG. 3). As shown in FIG. 6, the control voltage generating means may alternatively be an adjustable voltage generating element 40 having its output 6 connected to the controlled circuit 5, the output signal forming the control signal.

I claim:

1. A circuit to reduce color mixing, interference, or cross-modulation, for use with a color television coding circuit, comprising an input terminal (1) receiving a luminance signal;
an output terminal (7) adapted for connection to the coding circuit and supplying a low-interference luminance signal thereto;
and a transmission channel between the input terminal and the output terminal;
wherein, in accordance with the invention, the transmission channel comprises
a subtraction circuit (3) receiving the luminance signal;
a branch circuit, including
a band-pass filter (4) connected to receive the luminance signal and
a controlled circuit (5) having a main input terminal and a control input terminal (6), said main input terminal being serially connected with the band-pass filter,
the branch circuit being connected to the subtraction circuit to apply a subtraction signal to the subtraction circuit (3); and
a control signal generating circuit, connected to said control input terminal (6) and controlling the level of transmission of the controlled circuit (5) as a function of portions of the luminance signal which are approximately centrally within the range of the chroma subcarrier of a television signal.

2. Circuit according to claim 1, further including a control voltage generating means including an adjustable voltage generating element (40) having its output connected to control the controlled circuit and forming said control signal.

3. Circuit according to claim 1, wherein said controlled circuit comprises a controlled amplifier, the amplification of which is controlled by said control signal.

4. A circuit to reduce color mixing, interference, or cross-modulation, for use with a color television coding circuit, comprising an input terminal (1) receiving a luminance signal;
an output terminal (7) adapted for connection to the coding circuit; and
a transmission channel between the input terminal and the output terminal;

wherein, in accordance with the invention, the transmission channel comprises a subtraction circuit (3) receiving the luminance signal;

a branch circuit including a band-pass filter (4) connected to receive the luminance signal and a controller circuit (5) serially connected with the band-pass filter, the branch circuit being connected to the subtraction circuit to apply a subtraction signal to the subtraction circuit (3); and a control signal generating circuit controlling the level of transmission of the controlled circuit (5) as a function of a portion of the luminance signal, which portion is within the band-pass width of the chroma subcarrier of a television signal, said control signal generating circuit comprising level signal generating circuits (19,20) having the chroma difference signals (R-Y, B-Y) applied thereto, and a summing circuit (21) assuming the output signals from the level signal generating circuits.

5. A circuit to reduce color mixing, interference, or cross-modulation, for use with a color television coding circuit, comprising an input terminal (1) receiving a luminance signal;

an output terminal (7) adapted for connection to the coding circuit; and a transmission channel between the input terminal and the output terminal;

wherein, in accordance with the invention, the transmission channel comprises a subtraction circuit (3) receiving the luminance signal;

a branch circuit including a band-pass filter (4) connected to receive the luminance signal and a controlled circuit (5) serially connected with the band-pass filter, the branch circuit being connected to the subtraction circuit to apply a subtraction signal to the subtraction circuit (3); and a control signal generating circuit controlling the level of transmission of the controlled circuit (5) as a function of a portion of the luminance signal, which portion is within the band-pass width of the chroma subcarrier of a television signal, the control signal generating circuit (6; 19-23) including a synchonous demodulator (27) demodulating the luminance signals with respect to the chroma subcarrier; and a low-pass filter (29) connected to receive the output of the synchronous demodulator (29), the output of the low-pass filter providing a control signal (R) to control the controlled circuit (5) in said branch circuit (4,5).

6. A circuit to reduce color mixing, interference, or cross-modulation, for use with a color television coding circuit, comprising an input terminal (1) receiving a luminance signal;

an output terminal (7) adapted for connection to the coding circuit; and a transmission channel between the input terminal and the output terminal;

wherein, in accordance with the invention, the transmission channel comprises a subtraction circuit (3) receiving the luminance signal;

a branch circuit including a band-pass filter (4) connected to receive the luminance signal and a controlled circuit (5) serially connected with the band-pass filter, the branch circuit being connected to the subtraction circuit to apply a subtraction signal to the subtraction circuit (3); and a control signal generating circuit controlling the level of transmission of the controlled circuit (5) as a function of a portion of the luminance signal, which portion is within the band-pass width of the chroma subcarrier of a television signal, the control signal generating circuit including a comb filter (31, 32) having the luminance signal applied thereto and being connected to a level signal generating circuit (33) and a detector (34) to derive said control signal (Q) for application to the controlled circuit (5).

* * * * *